United States Patent Office 3,071,608
Patented Jan. 1, 1963

3,071,608
PROCESS FOR PREPARING ETHYL PARANITRO-
PHENYL THIONOPHENYLPHOSPHONATE
Thomas M. Beck, Homewood, and George I. Klein, Park
Forest, Ill., assignors to Victor Chemical Works, Chicago, Ill., a corporation of Illinois
No Drawing. Filed Dec. 11, 1958, Ser. No. 779,555
3 Claims. (Cl. 260—461)

This invention relates to an improved method for making ethyl paranitrophenyl thionophenylphosphonate. More specifically, this invention relates to an improved method for making ethyl paranitrophenyl thionophenylphosphonate which provides for a significant increase in production and plant efficiency, a reduction in solvent losses, and the elimination of processing steps.

We have discovered that improved, and certainly unexpected, results are obtained when ethyl paranitrophenyl thionophenylphosphonate is prepared by reacting phenylphosphonothioic dichloride sequentially with ethanol and paranitrophenol in benzene and in the presence of triethylamine.

Ethyl paranitrophenyl thionophenylphosphonate, hereafter designated as "EPN," is a well recognized insecticide. It may be manufactured under prior art processes such as those disclosed in U.S. Patent 2,503,390. In this patent, the final product is made by a two-step reaction process which involves, first, the preparation of ethyl thionophenylphosphonyl chloride and, second, the reaction of this compound with sodium p-nitrophenate to form the EPN. These reactions may be illustrated as follows:

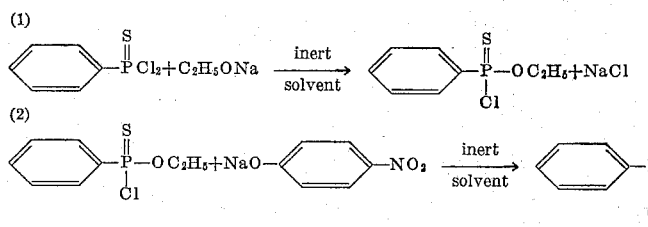

The patent further points out that Reaction 1, supra, may be carried out using ethanol and a hydrogen chloride acceptor such as pyridine, as would be illustrated by the following equation:

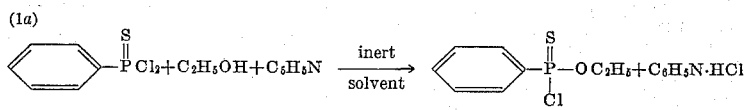

These prior art reactions, as illustrated above, are carried out in the presence of relatively large portions of inert solvent (e.g., benzene). A study of the examples reveals that the amount of inert solvent is approximately 1.3 ml. per gram of the principal reactants (the term principal reactants is sometimes herein intended to refer to the phosphorus compound, ethanol or its derivatives, and paranitrophenol or its derivatives) in the reactions illustrated by Reactions 1 and 1a, supra. In the reaction illustrated by Reaction 2, supra, the amount of inert solvent is approximately 1.6 ml. per gram of the principal reactants. This gives an over-all usage of approximately 1.5 ml. of inert solvent per gram of principal reactants.

We have now found that by the use of triethylamine as the hydrogen chloride acceptor in combination with the benzene solvent, the following advantages result:

A. Reactions 1 and 2 may be combined, sequentially, eliminating the separation of an intermediate.
B. The amount of benzene used is greatly reduced, i.e., about 0.80 ml. of inert solvent per gram of principal reactants.
C. Effective size or level of the charge, and thus production, per charge, is greatly increased.
D. Troublesome thickening of the charge is eliminated, thus improving heat transfer and shortening the reaction time.

The over-all reaction according to our new process proceeds as follows:

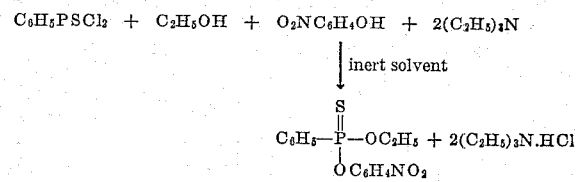

The following examples illustrate the process of this invention. Examples 1, 2 and 3 show the use of triethylamine, trimethylamine and pyridine, respectively. All of the reactants used in the examples (i.e., Examples 1–3) were the ordinary commercial grade of chemicals. The 2-B alcohol referred to therein is a standard denatured ethanol containing 0.5 percent benzene.

EXAMPLE 1

150 cc. of benzene were placed into a flask equipped with thermometer, agitator and condenser, including a calcium chloride tube. This was topped by distilling off 50 cc. The contents were then cooled and 66.3 grams of $C_6H_5PSCl_2$ were added. The condenser was replaced with a dropping funnel and a mixture of 15.3 grams of 2-B ethanol and 36.5 grams of triethylamine was then added at a temperature of 35–40° C. over a period of 27 minutes. The reaction was slightly exothermic and after the temperature ceased to rise spontaneously, the slightly viscous mixture was stirred for an additional two hours at 38–40° C. 43.1 grams of paranitrophenyl were then added, slowly at first so as to control temperature rise, thereby effecting a final temperature of 25° C.; it dissolved quickly and completely. 30.2 grams of triethylamine were then added over a period of 20 minutes, thereby bringing the temperature to 60° C. The mixture thickened somewhat, but was stirred for an additional 45 minutes at 55–60° C. It was then cooled, 250 cc. of water were added plus an additional 200 cc. of benzene. It was then shaken, separated and washed twice again with 250 cc. portions of water. The benzene was removed from the product layer by distillation to give 91.3 grams of ethyl paranitrophenyl thionophenylphosphonate, which represents a 90% yield. It should be noted that the final 200 cc. of benzene and the water washes were merely used in removing and separating the product and were not necessary to the actual reaction. In the actual reaction, only 0.82 ml. of benzene per gram of principal reactants was used.

EXAMPLE 2

375 cc. of benzene were added in a one liter flask, equipped with a thermometer, stirrer, condenser and soda lime tube. This was topped by distilling off 50 cc. Then, 105.5 grams of $C_6H_5PSCl_2$ were added. The condenser was then replaced with a dropping funnel containing a previously prepared solution of 33.5 grams of trimethylamine in 24 grams of 2-B ethanol. This mixture was added dropwise over a period of 15 minutes at a temperature of 35–40° C., using ice-water cooling. The mixture was then stirred at this temperature for an additional thirty minutes. 69.5 grams of paranitrophenol where then added, slowly at first to prevent temperature rise. A heavy precipitate formed which prevented complete stirring and necessitated the addition of 50 cc. of benzene. This addition effected satisfactory stirring and the temperature was then raised to 60° C. 30.0 grams of trimethylamine were then added by distilling into the reaction flask through a tube extending below the surface of the reaction mixture. The temperature was held at 60° C. during the addition. The mixture again became too thick to stir, therefore, another 50 cc. of benzene were added. This was not sufficient for good stirring so the agitator speed was doubled from 300 r.p.m. to 600 r.p.m. The total addition time was 50 minutes, after which it was held an additional 15 minutes at 60° C. The product was then washed, stirred and separated three times with 375 cc. portions of water. The first wash water was further extracted with an additional 160 cc. of benzene. The benzene was removed by distillation to give 145.5 grams (90%) of EPN. This reaction required 1.42 ml. of benzene per gram of principal reactants.

EXAMPLE 3

300 ml. of benzene were placed in a 500 ml. flask, equipped with thermometer, stirring rod and condenser. This was topped by distilling off 100 ml. The remainder was cooled and 66.3 grams of $C_6H_5PSCl_2$ were added. The condenser was then replaced with a dropping funnel and a mixture of 15.3 grams of anhydrous 2-B ethanol and 28.5 grams of pyridine were added at 35–40° C. over a 20 minute period. The mixture was then stirred for an additional 2½ hours at 40° C. This resulted in the formation of a heavy sludge of pyridine hydrochloride. The addition of 42.0 grams of paranitrophenol formed a still heavier, almost unstirrable sludge. 23.6 grams of pyridine were then added over a 15 minute period with no observable heat of reaction. The temperature was raised to 50° C. during the latter part of the addition and was then held at 60° C. for one hour. There was no apparent change in the amount of solid pyridine hydrochloride. The mixture was then cooled, mixed with 100 ml. of benzene and sufficient water to dissolve the amine salt, and transferred to a separatory funnel where it was washed three times with 250 ml. portions of water. The benzene was then removed from the product layer by distilling to a final temperature of 70° C. at 5 mm. of mercury pressure. 89 grams of product was produced, which had a melting point of 40–65° C. This was low purity material in view of the 37° C. melting point of the pure product. This reaction required 1.66 ml. of benzene per gram of principal reactants.

The results of the preceding experiments (i.e., Examples 1–3, supra) are summarized in Table I, infra.

Table I

| | Amine Used | | |
|---|---|---|---|
| | $(C_2H_5)_3N$ | $(CH_3)_3N$ | $C_5H_5N$ |
| Ethanol Reaction | Moderate | Fast | Moderate. |
| PNP [1] Reaction | Fast | Slow | Slow. |
| Solid Formation | Light | Very heavy | Heavy. |
| Benzene/Reactants Ratio (i.e., Ml. of Benzene/Gm. of Reactants) | 0.82 | 2.14 | 1.66. |
| Product Quality | Good | Good | Poor. |

[1] Paranitrophenol.

The data that are set forth in Table I, supra, clearly indicate that in spite of the reduced amount of benzene which is used with the triethylamine, the reaction proceeds smoothly in all respects and produces a good product with minimum difficulties.

The temperatures and general reaction conditions for carrying out this invention are not of a critical nature. The addition of the ethanol-triethylamine mixture is preferably carried out at 35–40° C. but temperatures up to the boiling point of the mixture may be used. The final addition of triethylamine following the paranitrophenol addition is preferably carried out at temperatures below 60° C.; however, higher temperatures, up to the boiling point of the reactants, may be used. In each case the temperature range is more nearly controlled by the equipment limitations rather than the critical nature of the reaction itself.

The proportions of all reactants used in our reaction are approximately stoichiometric based upon the amount of phenylphosphonothioic dichloride which is used. It is generally preferable to use a slight excess, for example, up to ten percent, of ethanol, paranitrophenol, and triethylamine so as to assure maximum yields based upon the phenylphosphonothioic dichloride.

The amount of benzene used in our reaction has been given in terms of volume of benzene per weight of principal reactants since the benzene is normally measured volumetrically rather than weighed. Since benzene has a density of only 0.879 gm./ml., a prior art ratio of 1.42 ml./gm. is equal to a ratio of 1.1 gm. of benzene per gram of reactants. On the other hand, the present invention, which results in a ratio of 0.82 ml./gm., is equal to a ratio of 0.722 gm. of benzene per gram of reactants. Thus, whereas the prior art method used a weight of benzene in excess of the weight of the reactants, in the present invention the amount of benzene that is used may be as low as 0.70 that of the weight of the reactants.

The terms ethanol and paranitrophenol are hereinafter intended to include suitable salts such as sodium ethylate and sodium paranitrophenolate.

The foregoing detailed description has been given for clearness of understanding only, and no unnecessary limitations should be understood therefrom, as modifications will be obvious to those skilled in the art.

We claim:
1. The method of producing ethyl paranitrophenyl thionophenylphosphonate comprising: reacting phenylphosphonothioic dichloride sequentially with ethanol and paranitrophenol in the presence of benzene and triethylamine, the weight of the benzene used not exceeding the combined weight of phenylphosphonothioic dichloride, ethanol and paranitrophenol; and recovering ethyl paranitrophenyl thionophenylphosphonate.

2. The method of producing ethyl paranitrophenyl thionophenylphosphonate comprising: reacting phenylphosphonothioic dichloride sequentially with substantially stoichiometric proportions of ethanol and paranitrophenol in the presence of benzene and a substantially stoichiometric amount of triethylamine, the weight of the benzene used not exceeding the combined weight of phenylphosphonothioic dichloride, ethanol and paranitrophenol; and recovering ethyl paranitrophenyl thionophenylphosphonate.

3. The method of producing ethyl paranitrophenyl thionophenylphosphonate comprising: combining substantially stoichiometric amounts of ethanol and triethylamine with the combination of phenylphosphonothioic dichloride and benzene; sequentially incorporating a substantially stoichiometric amount of paranitrophenol and a second substantially stoichiometric amount of triethylamine into the reaction mixture, the weight of the benzene used not exceeding the combined weight of phenylphosphonothioic dichloride, ethanol and paranitrophenol; and recovering ethyl paranitrophenyl thionophenylphosphonate.

References Cited in the file of this patent
UNITED STATES PATENTS

| | | |
|---|---|---|
| 2,460,043 | Teeters | Jan. 25, 1949 |
| 2,503,390 | Jelinek | Apr. 11, 1950 |
| 2,759,961 | Fitch | Aug. 21, 1956 |
| 2,863,903 | Toy | Dec. 9, 1958 |